Patented May 20, 1952

2,597,437

UNITED STATES PATENT OFFICE 2,597,437

CATION-EXCHANGE POLYMERS OF THE CARBOXYLIC TYPE

George W. Bodamer, Cheltenham, Pa., assignor to Rohm & Haas Company, Philadelphia, Pa., a corporation of Delaware No Drawing. Application May 12, 1951, Serial No. 226,091

6 Claims. (Cl. 260—83.5)

This invention relates to cation-exchange polymers and to their preparation and use. It relates to insoluble cation-exchange resins of the carboxylic type which are proliferous polymers and which are characterized by unusually large areas of surface, high degrees of porosity, high adsorption-capacity, rapid rates of adsorption and the ability to form insoluble, impalpable suspensions in aqueous fluids. More specifically, it relates to the preparation and use of polymers which have the chemical properties of cation-exchange resins and the physical properties of popcorn or proliferous polymers. As a result of this peculiar combination of chemical and physical properties these ion-exchange resins are particularly suitable for a variety of new uses such as in selective adsorption and in sodium-reduction therapy.

Other cation-exchange resins of the carboxylic type are available and their preparation is described, for example, in D'Alelio's Patents Nos. 2,340,110 and 2,340,111. They are characterized by being hard, friable, dense, infusible, insoluble, granular or spheroidal particles which contain in their chemical configuration carboxylic acid groups, —COOH, or carboxylate groups, —COOM, where M is one equivalent of a metal. As far as the chemical properties of these known resins and the chemistry of ion-exchange are concerned, the available products are quite satisfactory. But the physical properties of these materials—particularly their hard, dense, granular form—limit their utility in many instances where their chemical properties would appear to make them ideally suited.

The object of this invention, therefore, is to provide resins which have different physical properties from those of the ion-exchange resins known heretofore. Another object is to use these new resins for the adsorption of cations from fluids, particularly in those applications where the older cation-exchange resins which are currently available do not perform as well as is desired.

By way of example, it has been found that medical patients who suffer from edema can be greatly relieved by the administration of carboxylic cation-exchange resins. In cases of edema, excessive amounts of fluid cause swelling in the patient's body. The fluid is retained by the presence of abnormal amounts of sodium salts which the patient's system fails to eliminate. Formerly it was necessary to impose a salt-free diet in order to reduce the quantity of sodium salts and, hence, the swelling. Recently it was found that the sodium-content of the body could be reduced by the use of ion-exchange resins of the carboxylic type. However, oral administration of the resins was difficult and unpleasant because large doses were required and because the particles of the resins then available were hard, dense, granular and gritty, and did not disperse well in aqueous media.

Products of this invention, on the other hand, are soft and are readily suspended in aqueous media. On simple stirring or shaking they form uniform and smooth dispersions which are consequently very easily swallowed. Thus, they are eminently suited for use in sodium-reduction therapy.

These new products are opaque, infusible, proliferous or popcorn polymers containing at least 70% proliferously polymerized acrylic acid. They are made, as is described in greater detail below, by proliferously polymerizing acrylic acid, or by proliferously polymerizing an ester of acrylic acid and then hydrolyzing the proliferous, polymeric ester to proliferous polyacrylic acid. Surprisingly, the hydrolysis of the popcorn polyesters does not destroy or significantly change the physical form of the polymers despite the chemical change from polyesters to polyacid. The resultant products, containing carboxylic acid groups, have cation-exchanging properties and also are bulky, porous, insoluble masses having the properties which are associated with popcorn or proliferous polymers.

Various so-called popcorn polymers, with their unique physical characteristics, have been known since Kondakow first reported them in connection with his study of the polymerization of dimethylbutadiene (J. prakt. Chem. [2] 64, 109 (1901)). Likewise chloroprene "popcorn" was obtained by Carothers in his early work with chloroprene (J. A. C. S. 53, 4203 (1931)). Carothers labeled this polymer omega-chloroprene, in order to distinguish it from his other rubber-like polymers, and he likened it to Kondakow's "cauliflower" product. A similar kind of polymer was recorded by Staudinger and Huseman in their study of the polymers and copolymers of styrene (Berichte, 68, 1618 (1935)), and by Britton et al. in U. S. Patent No. 2,341,175 of February 8, 1944. During the development of the synthetic rubber program the formation of popcorn polymers was such a constant and troublesome problem that several projects were set up to study ways of preventing the formation of the undesirable materials (Kharasch et al., Ind. Eng. Chem. 39, 830 (1947); Welch et al., Ind. Eng. Chem 39, 826 (1947); and Devins et al., Canadian J. Res. 26B, 356 (1948)). Furthermore, similar polymers have been known for at least fifteen years in connection with the manufacture of the acrylic plastics from polymethyl methacrylate, ethyl acrylate, etc.

Heretofore, however, the popcorn polymers had little, if any, utility and their formation was something to be avoided. No practical uses were known for them and, in fact, the studies referred to above by Karasch, Welch, Devins and their associates were prompted by a desire and a real need to prevent the formation of such polymers since their formation interfered with the production of the desired products.

Popcorn polymers are distinct kinds of polymers and they have a community of physical properties. Thus, they have a fibrous, spongy, porous structure and are insoluble in the very solvents which dissolve the homogeneous, thermoplastic polymers which are normally made from the same monomers. In most cases they do look very much like popcorn or alpha-cellulose and have been variously described as sponge-like, cauliflower-like, and coral-like. They have very high molecular weights and appear to some extent to be cross-linked. In addition to their general similarity in physical properties they are formed in much the same way by auto-catalyzed polymerization, and the characteristic manner in which they are formed helps to identify them. In the process of preparing popcorn polymers the induction period may be long; but soon after a particle of the polymer is formed or is added, the rate of polymerization increases rapidly and the branching, insoluble polymer continues to form until most or all of the monomer is consumed. This is usually referred to as "popping." It is characteristic of this type of polymerization that the polymer is insoluble in the monomeric material from the very beginning to the end of the polymerization and that the polymer "grows" in much the same way as a salt-crystal "grows" when a salt solution is concentrated. Also, the proliferous polymers are insoluble in the organic liquids which dissolve the normal thermoplastic polymers. If the product is not confined or restrained physically, polymerization proceeds in random directions with the formation of a branched or clustered, expanded or "popped" product. That is, polymerization progresses by proliferation with the rapid and repeated production of new parts; and for this reason the term "proliferous polymer," which has been applied to this kind of polymer and which is now synonymous with "popcorn polymer," is particularly apt—and is truly descriptive.

The products of this invention are cation-adsorbing, proliferous polymers or copolymers of acrylic acid. The exact composition of the resins can vary within reasonable limits depending upon the degree of hydrolysis of the polyester from which these acidic products are made or depending upon the materials which are copolymerized with the acrylic acid or acrylic ester in order to facilitate popping or to modify some physical property, such as the porosity of the finished product. In any case, the resins of this invention are polymers which contain at least 70% polyacrylic acid on a weight-basis. And as such they have a very high cation-adsorbing capacity per unit of weight.

All polyacrylic acid esters which are proliferous polymers can be hydrolyzed to the proliferous polyacrylic acid resins of this invention. For example the popcorn polymers of the following esters can be so employed: Aliphatic esters such as methyl, ethyl, n-propyl, iso-propyl, n-butyl, iso-butyl, sec.-butyl, tert.-butyl, iso-amyl, cyclohexyl, octyl, lauryl, and octadecyl acrylates and the homologs and isomers thereof; and aryl esters such as benzyl and phenylethyl acrylates. It is, however, true that the tendency of acrylic esters to form proliferous polymers diminishes rapidly as the size of the alkyl group is increased and the highest ones are actually difficult to prepare. Likewise, aryl esters do not "pop" as readily as the lower alkyl esters. For this reason it is much more economical and satisfactory to employ the polymeric lower alkyl esters which contain up to four carbon atoms in the alkyl group of the ester. Another very good reason for preferring the carboxylic cation-exchange resins from the lower alkyl esters is that the alkyl or aryl group of the ester is split off during hydrolysis in the form of an alcohol and it does not, therefore, contribute to the properties of the final polymer. Consequently, the proliferous polyesters which are the cheapest and are most readily hydrolyzed are the most satisfactory ones to use.

Similar cation-exchange resins are those of proliferous methacrylic acid. These, however, do not have as high capacity and are more difficult to prepare because the proliferous polyesters of methacrylic acid do not hydrolyze readily to the polyacid, although the proliferous polyesters themselves are more easily prepared.

Proliferously polymerized polyacrylic acid and the proliferously polymerized esters of acrylic acid which are hydrolyzable to the products of this invention are prepared in various ways. In fact, as was stated above, such proliferous polymers often form spontaneously from monomers in storage. In commercial production of the products of this invention it is obviously necessary to provide a steady supply and this can be done by maintaining at a temperature from about 0° C. to about 100° C. a mixture of acrylic acid or of a monomeric acrylic acid ester and a polyolefinic compound, preferably a conjugated diolefinic compound, which is copolymerizable with said acrylic acid or acrylic ester. Acrylic acid polymerizes proliferously more readily than do its esters and lower temperatures can, therefore, be employed in popping the acid per se. It is suggested that the polymerization be carried out in a closed system where the amount of oxygen is negligible. It is even better to carry out the reaction in an inert atmosphere. It is also recommended that there be added to the mixture a small but catalytic amount of a previously prepared polymer which acts as a seed and from which the polymer grows rapidly. The addition of such a seed greatly reduces the otherwise long induction period.

In general, polymerization progresses more rapidly as the temperature is raised, but at temperatures above about 90° C. the proliferous polymer may be formed together with an objectionable amount of the normal, glass-like polymer and consequently temperatures from about 20° C. to about 80° C. are preferred and recommended.

A wide variety of polyolefinic compounds definitely assist in the formation of the popcorn polymers of acrylic acid and of acrylic acid esters. The auxiliary compounds function as popping agents and examples of some of the best include divinylbenzene, butadiene, isoprene, bimethallyl, biallyl, trivinylbenzene, dicyclopentadiene and similar polyolefinic hydrocarbons. Also effective are other unsaturated compounds such as dimethallyl ether and sulfide, vinyl allyl ether and those unsaturated esters, such as diallyl maleate and 2-chloroallyl crotonate, which are disclosed in U. S. Patents Nos. 2,311,615 and 2,341,175. The auxiliary compounds copolymerize with the acrylic acid or ester and consequently are present in the final copolymeric products. This is one reason why the polyolefinic hydrocarbons are preferred. All of the auxiliary compounds are copolymerizable with the acrylic acid or its esters. Also, all are polyolefinic compounds in which the olefinic linkages are in the acyclic portions of the molecule and are the reactive groups which enter into the copolymerization reaction.

It is evident that as the amount of the auxiliary compound is increased the number of carboxyl groups per unit of weight is necessarily reduced. And since the capacity of the final resin for adsorbing cations is proportional to the number of carboxyl groups in the product, it is desirable to hold the amount of the copolymerizable auxiliary compound to a minimum. On the other hand, and despite the fact that acrylic acid and its esters do polymerize proliferously alone depending upon their source and presumably upon mere traces of impurities, the use of an auxiliary polyolefinic compound does exert an advantageous effect upon the speed of polymerization and upon the character and uniformity of the product. The use of as little as 0.5% of a copolymerizable auxiliary popping agent is evident in the results which obtain, but the most satisfactory and suggested amounts are from 2% to 30%, based on the total weight of this compound and the acrylic acid or ester. The use of larger amounts has been studied but there does not appear to be any advantage in exceeding 30%—or even 20%—particularly when the ion-adsorbing capacity of the final product is considered. While all of the auxiliary compounds are alike in having a plurality of non-benzenoid, olefinic linkages or double bonds in their chemical structure and in facilitating the popping of acrylic acid and its esters, it is also true that these compounds differ in degree with regard to the effect they have on the density and porosity of the final copolymer. For example, a material such as divinylbenzene, which is recognized as a particularly fast and efficient cross-linking agent for such polymers as styrene, polyacrylic acid esters and vinyl compounds in general, aids very definitely in the popping of acrylic acid and its esters but it also gives rise to a harder, less porous, popcorn polymer than do many of the other auxiliary agents such as butadiene or isoprene. Consequently, the amount, within the limits set forth above, of the auxiliary, copolymerizable compound which is employed is determined by the degree of porosity or extent of surface-area which is desired in the final product. For purposes of this invention a maximum of about 5% divinylbenzene is recommended while as much as 30% —or preferably 20%—of butadiene or isoprene is satisfactory.

The use of a seed to promote the proliferous polymerization is not necessary but is most desirable. The material which is used as a seed can have the same chemical composition as the proliferous polymer which it is desired to make or it can have a different chemical composition. A convenient method involves adding a small amount of a previous batch of proliferous polymer to subsequent mixtures of monomeric materials which are to be popped. Even the quantities of one batch which may adhere to the equipment serve to seed subsequent batches. The word "seed" is used herein in the accepted chemical sense and itself indicates that the amount required is very small and that the material is insoluble in the reaction mixture. As little as about 0.001%, on a weight basis, is adequate. Of course, when the seed and the polymer being prepared have the same chemical composition, the amount of the seeding material which is employed is immaterial.

Acrylic acid and its esters can be made to polymerize proliferously in bulk or in solutions or while suspended in an immiscible liquid medium. The advantage of carrying out the polymerization by the suspension technique is that the product is obtained in the form of small, discrete particles which exchange cations unusually rapidly and which, although small, possess the advantageous properties of popcorn polymers, such as porosity, high surface-area, insolubility, and ease of dispersion in aqueous media.

It appears that free radicals, such as are provided by organic peroxidic compounds, play a part in the formation of proliferous polymers, just as they do in the formation of clear, glass-like, thermoplastic polymers. In proliferous polymerization however, the amount of peroxidic compounds, such as benzoyl, lauroyl, stearoyl peroxides, tert.-butylhydroperoxide, and the inorganic per-salts, which can be tolerated is relatively very low and should not exceed 0.5% on a weight basis because large amounts of such compounds favor the formation of the clear, glass-like polymers at the expense of the opaque, proliferous polymers. In like manner a steady and continuous supply of oxygen is to be avoided. That is to say, oxygen should be eliminated, and while the amount of air which is ordinarily present in a closed reaction vessel is not too objectionable, it can be replaced to good advantage by an inert gas. Thus, it is most desirable to conduct the proliferous polymerization in the substantially complete absence of oxygen.

The proliferous polymers of the acrylic esters, regardless of their origin or method of production, are hydrolyzed to the cation-adsorbing products of this invention. Aqueous or alcoholic solutions of strong bases; e. g., sodium hydroxide, potassium hydroxide, or quaternary ammonium hydroxides, are employed. Best results have been obtained by using a 5-8% alcoholic solution of potassium hydroxide or a 2-15% aqueous solution of sodium or potassium hydroxide. For reasons of economy the use of sodium hydroxide is preferred. In some instances, for example in sodium-reduction therapy, it is desired that the ion-exchange resin be in the potassium form and in such cases potassium hydroxide is advantageously employed. But even there, sodium hydroxide can be used in the hydrolysis step, followed by the conversion of the resin from the sodium form to the potassium form by treatment with a concentrated solution of a soluble potassium salt such as potassium chloride. A large excess (2-5 times the stoichiometrical amount) over the stoichiometrical amount of the strong base is recommended, especially in view of the fact that this reagent is not contaminated by the insoluble polymers and any portion of it which is not consumed can be reused. High temperatures are preferred during the hydrolysis step because they accelerate the rate of reaction and heating at refluxing temperatures is recommended. It is most desirable to hydrolyze the polyester as near to completion as is possible or feasible because the capacity of the final products to adsorb cations is obviously proportional to the number of salt-forming carboxyl groups in the product. In commercial production a period of heating from twelve to thirty hours is generally satisfactory.

After this step of hydrolysis the resin is filtered and washed. It is in the form of a salt of proliferous polyacrylic acid. It can be used as such for ion-exchange purposes or can be converted to the hydrogen or acid form by treatment with a strong acid such as hydrochloric or sulfuric acid. This conversion can be accomplished by stirring the resin in an acid solution and thereafter separating the resin by filtration or decantation. Alternatively the well known "column technique" can be followed in which the acid solution is passed through a bed of the resin which is supported in a cylindrical container. Or the hydrolyzed product is converted into the form of any salt by treating the resin with an excessive amount of an inorganic salt in aqueous solution.

The products of this invention are polymers. They are polymers or copolymers of polyacrylic acid and its salts. They represent a particular type or kind of polymer; viz., the proliferous or popcorn polymers or copolymers of polyacrylic acid and its salts. As such, they are distinctly different from linear, fusible, water-soluble polymers on the one hand and from cross-linked, non-thermoplastic, hard, water-insoluble polymers on the other.

The differences are best appreciated from a consideration of the sodium salts of the three kinds of polymeric acrylic acid. Linear, sodium polyacrylate is soluble in water. And while very dilute solutions of this sodium polyacrylate have relatively high viscosities, they are nevertheless true solutions from which the salt cannot be removed by mechanical means such as filtration. The sodium salts of cross-linked polymers or copolymers of acrylic acid which contain as little as 0.5% of a diolefinic cross-linking agent such as divinylbenzene are insoluble in water. Even when the particles swell in water to several times their original volume, they remain in the form of hard, firm, discrete and insoluble particles. Or when the particles of the cross-linked polymers are ground so fine as to pass a standard 100-mesh screen, they remain insoluble; and a paste or slurry of them feels gritty when rubbed between the fingers. Now when the proliferous polymers of this invention are placed in water, they also swell to many (about 2 to 20) times their original volume and, while they remain insoluble and can be removed by centrifuging or filtration, they occlude or trap so much water in addition to the water of swelling—presumably due to their fibrous or sponge-like character—that the suspended material is gelatinous in appearance and the dispersed particles are not at all discernible when the dispersion is rubbed between the fingers. Thus, in contrast with the soluble polymers and with the granular, insoluble polymers described previously, the products of this invention form insoluble and impalpable suspensions in water.

The difference in behavior of conventional, homogeneous, water-insoluble, cross-linked polymers of acrylic acid and of opaque, water-insoluble, proliferous polymers of acrylic acid when they are placed in an aqueous medium serves, therefore, as a convenient means of distinguishing one from the other. The former do not wet readily, settle out rapidly, and are gritty to the feel, while the latter disperse instantaneously, even when added as a compressed tablet, imbibe much greater quantities of liquid, and are impalpable. The following description serves both as an example of the difference in behavior of the two kinds of insoluble polymers of acrylic acid and also as a test for the proliferous polyacrylic acid products of this invention: One milliliter of a powdered (100 mesh), cross-linked copolymer of 98% acrylic acid and 2% divinylbenzene was stirred into 99 milliliters of water. The polymer was difficult to wet but it finally swelled to approximately four times its dry volume. Without agitation the resin settled out rapidly. When this mixture was filtered by gravity into a graduated cylinder, approximately 96 ml. of water was collected and the application of pressure or suction to the resin did not increase this amount of water appreciably. In contrast, one milliliter of a proliferous polymer of 98% acrylic acid and 2% divinylbenzene dispersed immediately on being mixed with 99 ml. of water. It swelled to many times its original volume and on standing slowly settled to a soft, impalpable, gel-like mass occupying approximately 17 ml. When this was filtered by gravity, only 83 ml. of water was collected. When, however, pressure was applied to the polymeric mass, an additional quantity of water equal to 11 ml. was removed. This last quantity of water had been trapped or absorbed between the fibers or particles of the proliferous polymer and illustrates the characteristic water-imbibing property of the proliferous polymers of acrylic acid.

The following examples are presented in order that the preparation and particularly the properties of the products of this invention may be thoroughly understood and recognized. The examples, which are illustrative, are not to be taken, however, as limiting this invention.

EXAMPLE 1

This serves to show how polyacrylic esters as exemplified by methyl acrylate can be conveniently converted into proliferous or popcorn polymers in bulk. In all cases a glass tube was half-filled with the methyl acrylate mixture to be popped. In some cases a small piece—a seed—of a previously prepared proliferous copolymer of 80% methyl acrylate and 20% isoprene was added. Also in most cases a minor amount of a polyolefinic compound was mixed with the methyl acrylate containing a catalytic amount of benzoyl peroxide. Nitrogen was bubbled through the materials in order to flush oxygen from the tubes and thereafter the tubes were sealed with a foil-lined cap and were placed in a constant-temperature water-bath. The kind and amount of the auxiliary popping-agent which copolymerized proliferously with the methyl acrylate are listed below together with other pertinent data. The percentages are based on the total weight of the copolymerizable mixture. Without exception, the polymerization was characterized by the rather long periods of induction which are recorded and during which no visible change occurred in the monomeric mixture, followed by shorter periods of propagation during which the insoluble polymers formed by proliferation. Also in all cases, except the one noted, the proliferous polymers occupied the entire volume of the tubes.

TABLE I

| Seed[1] | 0.003% Bz. Per.[2] | Polyolefinic Auxiliary Compound | Temp. °C. | Induction Period |
|---|---|---|---|---|
| + | − | 1% Divinylbenzene | 25 | Approx. 1 month. |
| + | − | do | 50 | 15–24 hours. |
| + | − | do | 65 | 4–7 hours. |
| + | − | do | 77 | 4–7 hours. |
| + | − | 0.1% Divinylbenzene | 50 | 1–2 days. |
| − | + | 1% Divinylbenzene | 50 | 21 hours. |
| − | + | do | 77 | No popcorn. Only clear resin. |
| − | − | do | 25 | Approx. 2 months. |
| − | − | do | 77 | 12–16 hours. |
| + | − | 2% Isoprene | 50 | 24–36 hours. |
| + | − | 5% Butadiene | 50 | 15–24 hours. |
| + | − | 5% Bimethallyl | 50 | 2 hours. |
| + | − | 5% Vinyl Allyl Ether | 50 | 3 days. |
| + | − | 5% Diallyl Maleate | 50 | 3 days. |
| + | − | 5% Trivinylbenzene | 50 | 12 hours. |
| + | − | 5% Dicyclopentadiene | 50 | 3 days. |

[1] Plus sign indicates presence and minus sign indicates absence of seed.
[2] Plus sign indicates presence and minus sign indicates absence of benzoyl peroxide.

EXAMPLE 2

Acrylic acid usually forms proliferous polymers more readily than its esters. Popping takes place at room temperature and in the case of large volumes of the acid it is necessary to provide cooling means so as to reduce the speed of polymerization which is progressively rapid and can easily reach the violent stage. The following mixtures were made in one-fifth-filled, half-pint bottles:

95 parts acrylic acid and 5 parts commercial divinylbenzene
90 parts acrylic acid and 10 parts butadiene
85 parts acrylic acid and 15 parts isoprene The oxygen was flushed out with nitrogen as in the case of Example 1 above. A small amount (about 0.5 part) of a proliferous polymer of 80% methyl acrylate and 20% isoprene was added to each mixture and the bottles were sealed. In every case the induction period was relatively short—a matter of minutes as contrasted with hours in the case of methyl acrylate described above. The growth of the proliferous polymers was extremely rapid. In every case the product was fibrous, extremely porous, and had an actual capacity for exchanging ions of over 90% of its theoretical capacity.

EXAMPLE 3

A proliferous polymer was made by the so-called emulsion polymerization technique as follows:

A two-liter, three-necked flask, equipped with mechanical stirrer, reflux condenser, and gas-inlet tube, was flushed free of oxygen by means of a stream of nitrogen over a period of 30 minutes. Then there was charged to the flask successively 147 parts of redistilled methyl acrylate, 3.4 parts of commercial divinylbenzene (43.7% divinylbenzene and 56.3% ethylstyrene), 18 parts of an aqueous solution of a commercial emulsifying agent (TRITON X-200), 0.0045 parts (0.003%) of ammonium persulfate and 900 parts of distilled water. The mixture was stirred and heated to 50° C. During the entire process a slow stream of nitrogen was passed through the mixture. Heating and stirring were continued for a period of 17 hours, after which the uniform, granular, popcorn polymer was separated by decantation, was washed with water, and was finally dried at 55° C. for 18 hours. The yield of 122 parts was equivalent to an 82% yield.

EXAMPLE 4

A very satisfactory method of making proliferous polymers which are characterized by extremely low density comprises placing in a large container the acrylic acid ester, with or without a seed and preferably with a small amount of a diolefinic, copolymerizable compound together with a volume of water which is about one to ten times the volume of the acrylic ester, and then preferably flushing oxygen from the container, sealing the container and finally tumbling or shaking the container so as to disperse the acrylic ester in the aqueous phase. The following tabulation lists compositions of methyl acrylate which were all converted substantially completely into popcorn polymers at 50° C. by this process. In the runs tabulated below, no seed was employed and the volume of water which was used was actually two and one-half times the volume of the polymerizable mixture. Here again, as in Example 1, the periods of induction, before the appearance of any polymer, were longer than the periods required to complete the formation of the proliferous polymers, once propagation had started.

TABLE II

| Peroxidic Catalyst | Diolefinic Compound | Induction Period |
|---|---|---|
| 0.003% Benzoyl Peroxide | 2% Isoprene | 2–2.5 days. |
| 0.003% Ammonium Persulfate | do | About 3 days. |
| None | 5% Isoprene | About 2 days. |
| 0.003% Benzoyl Peroxide | do | About 2.5 days |
| 0.1% Ammonium Persulfate | 5% Isoprene and 0.1% Divinylbenzene | 1–1.5 days. |
| 0.1% Acetyl Peroxide | do | Do. |
| 0.1% Benzoyl Peroxide | 5% Butadiene | Do. |
| 0.3% Ammonium Persulfate | do | Do. |
| 0.3% Ammonium Persulfate and 10 p. p. m. Ferrous Ammonium Sulfate. | do | Do. |
| 0.1% Mercaptoethanol and 10 p. p. m. Ferrous Ammonium Sulfate. | do | 3.5 days. |

EXAMPLE 5

This example illustrates one method of converting a proliferously polymerized ester of acrylic acid into a cation-exchange resin which resin is essentially a proliferous polymer of acrylic acid. This method has been used successfully for the conversion of a great number and a wide variety of the popcorn polyacrylic acid esters described above, including all of those prepared by the processes of Examples 1, 3, and 4 above. The process comprises hydrolyzing a proliferous polyacrylic acid ester by means of an alcoholic solution of a caustic alkali.

Into a 500 cc., three-necked flask, equipped with stirrer, thermometer, and reflux condenser, was charged 15 grams (0.17 mole) of a proliferous polymethyl acrylate containing 5% butadiene and 300 cc. of a 6% solution of potassium hydroxide in denatured ethyl alcohol (equivalent to 0.27 mole of potassium hydroxide). The popcorn polymer was the seventh one listed in Table II above. The mixture was stirred and heated at refluxing temperature for 18 hours. The liquid was then decanted and the proliferous resinous product was washed first with 200 cc. of ethyl alcohol and then with two 200 cc.-portions of water, after which the product was dried overnight in an oven at 65° C. The resin at this stage was in the form of a potassium salt. It was converted to the hydrogen or acid form by means of two washings with an excess of dilute sulfuric acid and was then rinsed with water.

The product was tested for its cation-exchange capacity. This was done by mixing an excess of a 0.1 N aqueous solution of sodium hydroxide and a weighed sample of resin in the hydrogen form. The mixture was stirred at room temperature for 24 hours after which the excess sodium hydroxide was back-titrated with standard acid. This particular resin had a capacity of 13.0 milliequivalents per gram as against a theoretical capacity of 13.1 milliequivalents per gram, which indicates that the proliferous polyester had been substantially completely hydrolyzed.

This material, like those made by hydrolyzing the popcorn products of the above examples, is somewhat soft and fluffy when dry. It has the general appearance and feel of alpha-cellulose. It was pressed into tablets or pellets at about 2000 lbs./sq. in. of pressure and the resultant tablets, like the original uncompressed material, dispersed very readily in water. The resin did not dissolve but it did imbibe large amounts of water and its aqueous dispersions are slightly gelatinous in appearance.

EXAMPLE 6

This example illustrates the method of converting a proliferous polyacrylic ester to a proliferous or popcorn cation-exchange resin by means of an aqueous solution of sodium hydroxide. Fifteen grams of the same resin which was employed in Example 5 was refluxed in the same equipment for 21 hours together with 765 grams of a 2% aqueous solution of sodium hydroxide. The product was filtered and the resin was suspended and stirred in 400 cc. of water for five minutes. It was decanted and washed again in the same way, after which it was dried overnight in an oven at 65° C. Later it was converted to the acid form and was tested in the same way as was the product of Example 5 and was found to have a capacity of 12.8 milliequivalents per gram. This product was identical with the product of Example 5 as far as appearance, feel, pelleting characteristics and dispersibility in water were concerned.

Not only do the cation-exchange resins of this invention have high capacity but they have an unusually rapid rate of adsorption which results from their unique physical form. This is borne out by the following comparison of a proliferous polyacrylic acid cation-exchange resin and a conventional carboxylic cation-exchange resin which is currently being marketed in large quantities.

EXAMPLE 7

A popcorn ion-exchange resin, for convenience labeled "Resin A," was made by the process of Example 6 above from a proliferous copolymer of 95 parts of methyl acrylate and 5 parts of butadiene, which copolymer was itself prepared by the process described in Example 4 above. The resin had a capacity of 12.5 milliequivalents per gram.

"Resin A" was compared with a commercially available carboxylic cation-exchange resin, labeled here for convenience "Resin B" and made according to the process of U. S. Patent No. 2,340,111 by copolymerizing, by the suspension-polymerization technique, a copolymerizable mixture of 95% methacrylic acid and 5% divinylbenzene in the presence of 1% benzoyl peroxide at a high temperature. Although "Resin B" was in the form of extremely small spheroidal particles and although it was insoluble by virtue of being cross-linked, it was not a proliferous or popcorn polymer.

The two resins, in the hydrogen form, were tested as to the rate at which they absorbed cations from a 1% aqueous solution of sodium chloride which also contained sodium bicarbonate and potassium bicarbonate in an amount equal to 0.05 of an equivalent weight of each per liter. (This solution simulated to some extent body fluids with which a resin might come in contact if taken internally.) A 100 cc.-volume of this solution was used in every case. In one comparison the correct weight of each resin, based on its capacity, was added so as to provide one equivalent weight of resin for each equivalent weight of all of the salts in the solution. In the other comparison only one-fifth of an equivalent weight of each resin was employed for each equivalent weight of salt in the solutions. The mixtures of resins and salt solutions were stirred continuously. Aliquots of the salt solutions were removed after 15 minutes, one hour, and 8 hours of contact and the composition thereof was determined. The results are given in Table III.

TABLE III

Percent of the total capacity of resin which is utilized

| Time of Contact | 1 Equiv. Resin, Resin A | 1 Equiv. Salts in Soln., Resin B | 1 Equiv. Resin, Resin A | 5 Equivs. Salts in Soln. Resin B |
|---|---|---|---|---|
| | Per cent | Per cent | Per cent | Per cent |
| 15 Min | 62 | 30 | 76 | 50 |
| 1 Hour | 69 | 48 | 83 | 65 |
| 8 Hours | 83 | 60 | 83 | 82 |

It is evident from this comparison that the proliferous Resin A absorbs ions at a much faster rate than conventional Resin B. Both resins adsorb cations faster as the ratio of cations to resin increases.

The resins of this invention are regenerated in the customary way—by washing with a solution of an acid or a salt solution. Regeneration efficiency is very high—much higher than that of the sulfonic-type exchangers.

I claim:

1. A process for preparing an opaque, infusible, proliferous polymer which forms an insoluble, impalpable suspension in water and is capable of exchanging cations, which process comprises proliferously copolymerizing, at a temperature from about 20° C. to about 80° C. in the substantially complete absence of oxygen and in the presence of a seed of a previously prepared proliferous polymer, a mixture of (a) a monomeric ester of acrylic acid and (b) a polyolefinic organic compound in which the olefinic linkages are in the acyclic portion of the molecule and are the reactive groups which enter into the copolymerization reaction, said mixture containing at least 70% acrylic acid, and then hydrolyzing the resultant proliferous copolymer by means of a solution of a strong base and thereafter isolating said opaque, infusible, proliferous polymer.

2. A process for preparing an opaque, infusible, proliferous polymer which is capable of exchanging cations, which process comprises proliferously copolymerizing, at a temperature from about 20° C. to about 80° C. in the substantially complete absence of oxygen and in the presence of a seed of a previously prepared proliferous polymer, a mixture of (a) 70–99.5% methyl acrylate and (b) 0.5–5% divinylbenzene, then hydrolyzing the resultant proliferous copolymer by means of a solution of a strong base, and thereafter isolating said opaque, infusible, proliferous polymer.

3. A process for preparing an opaque, infusible, proliferous polymer which is capable of exchanging cations, which process comprises proliferously copolymerizing, at a temperature from about 20° C. to about 80° C. in the substantially complete absence of oxygen and in the presence of a seed of a previously prepared proliferous polymer, a mixture of (a) 70–99.5% methyl acrylate and (b) 0.5–20% butadiene, then hydrolyzing the resultant proliferous copolymer by means of a solution of a strong base, and thereafter isolating said opaque, infusible, proliferous polymer.

4. A process for preparing an opaque, infusible, proliferous polymer which is capable of exchanging cations, which process comprises proliferously copolymerizing, at a temperature from about 20° C. to about 80° C. in the substantially complete absence of oxygen and in the presence of a seed of a previously prepared proliferous polymer, a mixture of (a) 70–99.5% methyl acrylate and (b) 0.5–20% isoprene, then hydrolyzing the resultant proliferous copolymer by means of a solution of a strong base, and thereafter isolating said opaque, infusible, proliferous polymer.

5. A process for preparing an opaque, infusible, proliferous polymer which is capable of exchanging cations, which process comprises proliferously copolymerizing, at a temperature from about 20° C. to about 80° C. in the substantially complete absence of oxygen and in the presence of a seed of a previously prepared proliferous polymer, a mixture of (a) 70–99.5% ethyl acrylate and (b) 0.5–5% divinylbenzene, then hydrolyzing the resultant proliferous copolymer by means of a solution of a strong base, and thereafter isolating said opaque, infusible, proliferous polymer.

6. A process for preparing an opaque, infusible, proliferous polymer which is capable of exchanging cations, which process comprises proliferously copolymerizing, at a temperature from about 20° C. to about 80° C. in the substantially complete absence of oxygen and in the presence of a seed of a previously prepared proliferous polymer, a mixture of (a) 70–99.5% ethyl acrylate and (b) 0.5–20% butadiene, then hydrolyzing the resultant proliferous copolymer by means of a solution of a strong base, and thereafter isolating said opaque, infusible, proliferous polymer.

GEORGE W. BODAMER.

REFERENCES CITED

The following references are of record in the file of this patent:

UNITED STATES PATENTS

| Number | Name | Date |
| --- | --- | --- |
| 2,340,111 | D'Alelio | Jan. 25, 1944 |

OTHER REFERENCES

Kern Kunststoffe, vol. 28, Oct. 1938, pp. 257–259.

Staundinger Berichte, vol. 64, pp. 2091–2098 (1931).

Kharasch Ind. and Eng. Chem., vol. 39, pp. 830–837, July 1947.

Kunin Ion Exchange Resins (1950), pp. 61, John Wiley & Sons, N. Y.